United States Patent [19]

Bononi

[11] 4,272,166
[45] Jun. 9, 1981

[54] TEMPLES FOR EYEGLASSES

[76] Inventor: Walter H. Bononi, Zeppelinstrasse 9, 7012 Fellbach-Schmiden, Fed. Rep. of Germany

[21] Appl. No.: 947,814

[22] Filed: Oct. 2, 1978

[51] Int. Cl.³ .......................... G02C 5/14; G02C 5/18
[52] U.S. Cl. .................................... 351/111; 351/122; 351/117
[58] Field of Search .............. 351/111, 114, 117, 123, 351/122; 2/448

[56] References Cited

U.S. PATENT DOCUMENTS

| 1,157,373 | 12/1914 | Farber | 351/114 |
| 1,705,228 | 3/1929 | Welsh | 351/122 |
| 1,708,204 | 4/1929 | Welsh | 351/114 |
| 2,259,082 | 10/1941 | Ring | 351/114 |
| 3,993,403 | 11/1976 | Brown | 351/122 |

*Primary Examiner*—John K. Corbin
*Assistant Examiner*—Rodney B. Bovernick

[57] ABSTRACT

A temple unit has a rod of metal damask with a spiral-shaped structure butt-soldered to a rigid metal profile. The rod is inserted axially into a clear plastic shell having a softness of shore-D-hardness less than 20 according to DIN No. 53 505, the West German national standard. The plastic shell is silicone rubber or polyurethane foam with very low resilience so that the unit exhibits a straight rod form in the semifinished state.

1 Claim, 3 Drawing Figures

TEMPLES FOR EYEGLASSES

BACKGROUND OF THE INVENTION

This invention relates to a temple for high-quality eye-glasses, which consists in the area of the ear of a rod composed of permanently but elastically bendable metal damask.

Such temples have been known for many generations. They have the advantage of allowing easy adjustment to the shape of the ear, of adjusting themselves to a certain degree to the shape of the ear, if, e.g., the volume of the skin increases with heat and decreases with cold, and in that the wearer of the glasses may subsequently correct the adjustment somewhat himself, since no heat is required to do so.

As a result of the microscopically small but regularly occurring unevenness, the rod stays well on the ear. When kept in pockets, cases, etc., a pair of eyeglasses provided with such temples occupies relatively little space, because the rod can be bent in a manner so as to decrease volume, without being deformed permanently, and besides, the rod is an esthetic structural element which can be produced in various metal colors.

This notwithstanding, the rod, as a thin structural element, has the disadvantage of exerting relatively great line pressure, so that the skin of the wearer may show impressions made by it. When the glasses flutter, for instance during sports activities, such as sailing, the small fluttering motions act as a drive on the rod, which in turn is now, so to speak, a dulled microsaw. In addition, the metal rod is a very good heat conductor and partial freezing can occur with low temperatures not only in the high mountains made accessible to mass tourism.

It is a task of the invention, by maintaining the advantages of the known rod of metal damask, to remedy all the disadvantages mentioned above in an inexpensive but high quality fashion.

BRIEF STATEMENT OF THE INVENTION

Pursuant to the invention, this task is solved in the manner that a thin plastic shell of very soft silicone rubber or polyurethane foam of very low restoring force (resilience) is pushed on to the rod, seated axially motionless on the latter, and that this unit exhibits in its semifinished state a straight rod.

The advantage of the invention is that the optician does not have to stock variable lengths of temples. Furthermore, temples, which do not fit in length, adapt themselves in this temple design to the wearer in length and the latter does not suffer at all from the faulty fitting.

Advantageously, the silicone rubber or polyurethane foam has a shore-D hardness below 20 according to DIN 53 505, which is the national industrial standard of West Germany.

A hardness, or more precisely, softness pursuant to this measure has proven itself very well in practical use because such a material is neither too lobed nor too hard.

BRIEF DESCRIPTION OF THE DRAWINGS

The invention will be more fully understood in the following detailed description of a preferred embodiment, taken together with the drawings in which.

DETAILED DESCRIPTION OF THE PREFERRED EMBODIMENT

Figure 1:
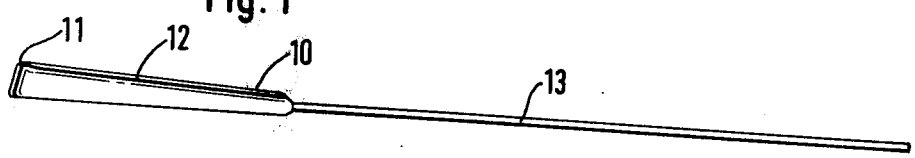
FIG. 1 is a side view of a left temple of metal.

Referring to the drawings, FIG. 1, shows a left temple of metal (10), which displays in front in the temple area half of a hinge-joint (11) and is fashioned in the temple area as a rigid metal profile (12). A rod (13) of metal damask with a spiral-shaped structure and a wire core is butt-soldered to the rigid metal profile (12).

Figure 2:
FIG. 2 is a side view of a shell according to the invention.

Referring to FIG. 2, a shell (14) of silicone rubber has low resiliency and softness of shore-D hardness below 20 measured according to DIN 53 505. The shell (14) is clear as glass, has a smooth surface and at one of its ends a tear-shaped thickening (15). This tear-shaped thickening (15) is flattened down. On the inside, the shell (14) exhibits to its geometrical axis a blind hole (16) extending up to the tear-shaped thickening.

Figure 3:
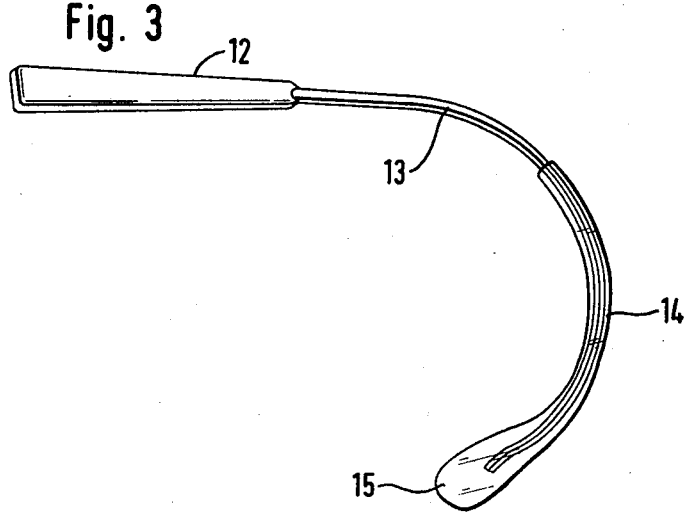
FIG. 3 is a side view of a temple unit in which the temple rod is inserted in the shell.

Referring to FIG. 3, the straight rod (13) is inserted into the blind hole (16), and due to the microrough surface of the metal damask a very good material and friction connection results between the rod (13) and the shell (14). Of course, this connection can be further improved by employing a suitable adhesive.

It is now easily possible to bend the rod (13) as before. Since the shell (14) has an extremely thin wall diameter on the essential part of its length, it does not exert any restoring force for all practical purposes. This restoring force becomes completely negligible, when rods of metal damask with a wire core are used.

Due to the fact that the metal damask has a spiral-shaped structure, the rod acts in the shell practically like a screw exhibiting many threads.

The shell (14) can be dyed in any desired color. When polyurethane foam is used, one should use the type with a closed surface.

What I claim is:

1. A temple unit for eyeglasses comprising:
   a rod of permanently but elastically flexible metal damask in the area of a wearer's ear having a temple area end and a free end,
   a thin sheath of a very soft material of silicone rubber seated axially motionless on said rod,
   said sheath having a very low restoring force so that said unit exhibits a straight rod form in its semifinished state
   said sheath having a Shore-D-Hardness below 20 measured according to DIN 53 505,
   said sheath having a tear-shaped thickening at its free end.

* * * * *